G. M. ROOS.
SUGAR BEET SEEDER.
APPLICATION FILED JAN. 4, 1909.

939,635.

Patented Nov. 9, 1909.
2 SHEETS—SHEET 1.

WITNESSES

INVENTOR
GUSTAV M. ROOS
BY Paul & Paul
HIS ATTORNEYS

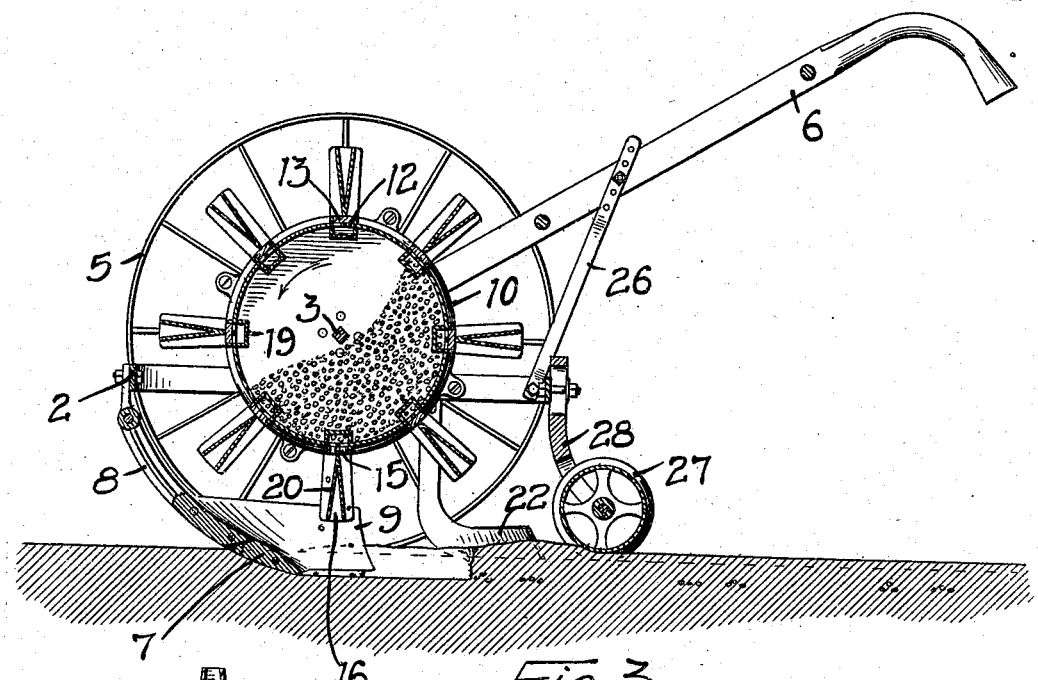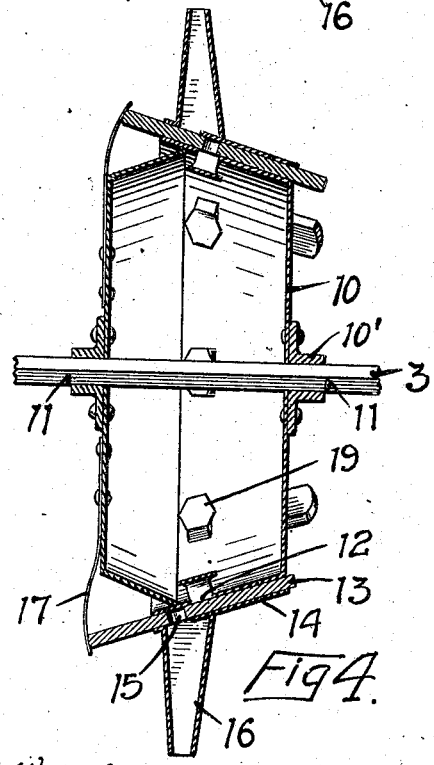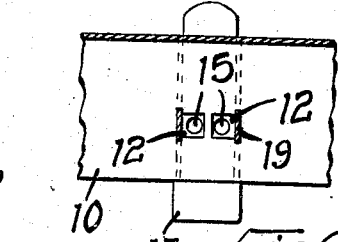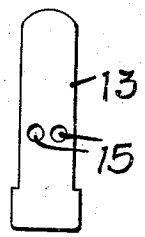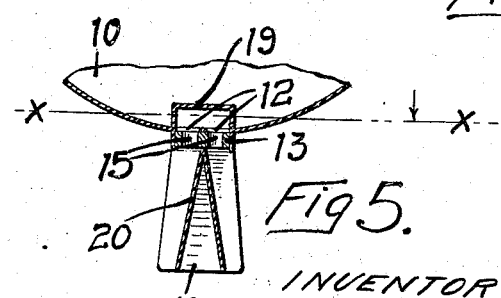

UNITED STATES PATENT OFFICE.

GUSTAV M. ROOS, OF WAVERLY, MINNESOTA, ASSIGNOR OF ONE-HALF TO LAMBERT G. ROSE, OF MINNEAPOLIS, MINNESOTA.

SUGAR-BEET SEEDER.

939,635.      Specification of Letters Patent.      Patented Nov. 9, 1909.

Application filed January 4, 1909. Serial No. 470,638.

*To all whom it may concern:*

Be it known that I, GUSTAV M. ROOS, of Waverly, Wright county, Minnesota, have invented certain new and useful Improvements in Sugar-Beet Seeders, of which the following is a specification.

The object of my invention is to provide a machine for handling seeds having irregular, rough surfaces, such as sugar beet seeds. Machines for handling smooth-surfaced seeds cannot be employed in seeding sugar beets, as the beet seeds will cling together and quickly clog the discharge orifice.

A further object is to provide a machine having a large capacity and one which will deposit the seed at regular intervals and without danger of it being blown away by the wind.

A further object is to provide a machine, which will deposit the seeds in two groups in each hill and in case both groups of seeds grow, one may be pulled up without disturbing the other group.

My invention consists generally in various constructions and combinations, all as hereinafter described and particularly described in the claims.

Figure 1:
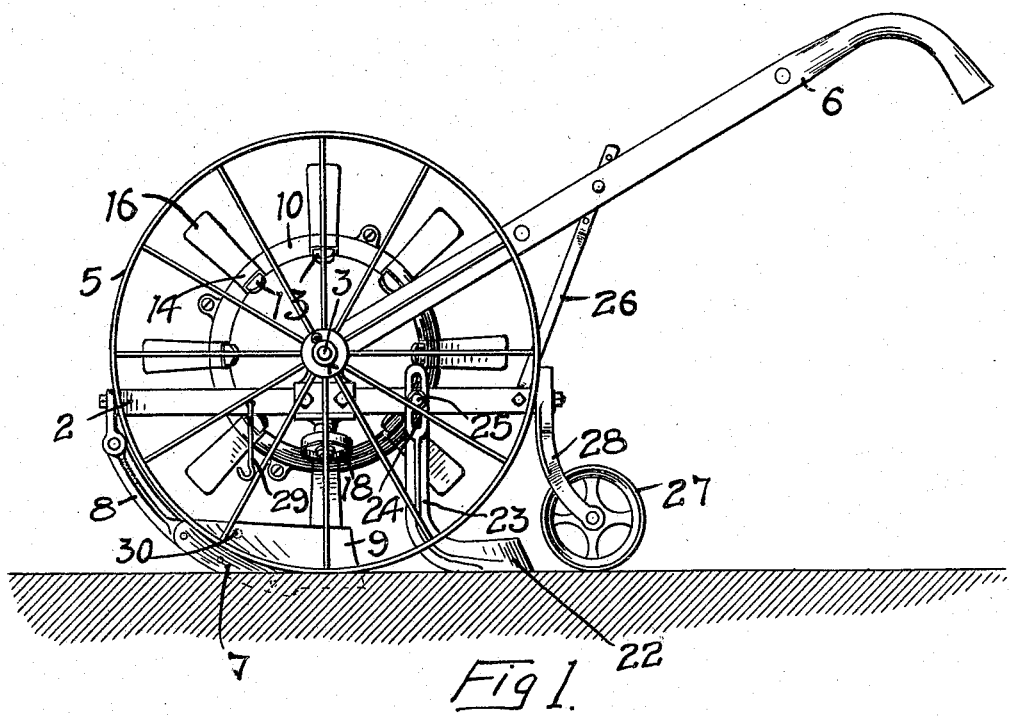
Figure 2:
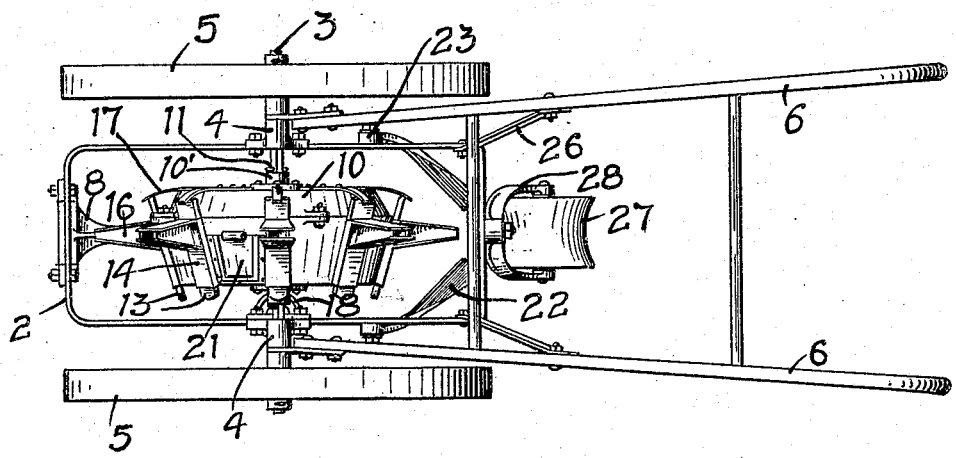

In the accompanying drawings, forming part of this specification, Figure 1 is a side elevation of a sugar beet seeding machine embodying my invention, Fig. 2 is a plan view of the same, Fig. 3 is a vertical, sectional view, Fig. 4 is a sectional view of the revolving receptacle, in which the seeds are placed, Fig. 5 is a detail, sectional view of one of the hopper openings, Fig. 6 is a sectional view on the line X—X of Fig. 5, Fig. 7 is a detail view of one of the feed slides.

In the drawing, 2 represents a frame and 3 an axle having bearings 4 on said frame and carrying wheels 5. Handle bars 6 are mounted on said axle and attached to the rear portion of the frame.

7 is a furrow-forming shoe having a drag bar 8 connected with the forward end of the frame 2, said shoe being adapted to plow a furrow in the ground, as the machine is pushed along. This plow has wings 9, which are attached at their forward edges to the drag bar 8 and flare outwardly and rearwardly therefrom, forming a space between them, wherein the seed droppers of the hopper discharge the seeds.

The middle portion of the axle 3 is square in cross section and a hopper 10 is mounted thereon and secured to the hubs 10', stop pins 11 in the axle preventing longitudinal movement of the hopper thereon. This hopper, as indicated in Fig. 4, is in the form of a double cone, its walls flaring outwardly from the ends toward its middle portion and at intervals discharge openings 12 are provided in the walls, through which the beet seed is fed. Feed slides 13 are provided and movable in guides 14 and have holes 15 that are adapted to register with the openings 12 in the hopper walls. This is the normal position of the slides, the guide wall forming the bottom of the pocket and preventing the escape of the seeds until the feed slide is moved. The holes in the slides are of sufficient size to contain the desired number of seeds to be deposited in the furrow.

Spouts 16 radiate from the hopper and are adapted to receive the seeds from the pockets in the feed slides and direct them into the furrow, the spouts and the furrow-forming blades protecting the seeds and preventing them from being blown away by the wind. Springs 17 are mounted on one end of the hopper and bear on the slides 13 and normally hold them with their pockets in position to receive the seeds from the hopper and at a predetermined point in the revolution of the hopper, a wheel 18 contacts with the ends of the slides successively and moves them lengthwise until the pockets register with the openings in the spout.

Within the hopper I prefer to provide a bridge or guard 19 over the feed opening, to prevent the seeds from wedging therein, said guard being open on each side and the walls of the hopper sloping toward the openings to direct the seed therein. I prefer also to provide two pockets or holes in the feed slides and a division 20 in the spout beneath, so that the seeds will be received and discharged in two groups, as indicated in Fig. 3, there being preferably two or three seeds in each group and two groups being arranged together at regular intervals in the furrow. I prefer to provide two groups of seeds in each hill and in case both groups grow, one may be pulled up, without disturbing the other group and if one group does not grow, the other one usually will. I am therefore, practically sure of having plants in every hill. The hopper has a filling opening covered by a slide 21, through which the seed is inserted.

In the rear of the hopper I provide covering blades 22 carried by shanks 23 that are adjustably supported on the frame 2, having a slot 24 and bolt 25 connection therewith. Bars 26 adjustably connect the handle bars 6 with the rear portion of the frame 2 and permit the said frame to be tilted. A hollow-faced wheel 27 is carried by a yoke 28 on the rear portion of the frame 2 and is adapted to travel over the furrow, after it has been filled by the action of the covering blades 22. The furrow-forming plow may be raised out of contact with the ground and supported on a hook 29 that is adapted to enter a hole 30 in one of the blades 9.

In the operation of the machine, the hopper is filled with seed, the furrow-opener adjusted and the machine pushed along the ground. The revolution of the hopper will agitate the seeds and cause them to feed down toward the discharge opening and into the pockets in the slide and as the slide passes the wheel 18, it will be moved lengthwise and the contents of its pockets allowed to fall into the spout beneath. The movement of the slide will be against the tension of its spring 17 and when the slide is moved by the operating wheel, the spring will return the slide to its normal position and move the pocket out of register with the spout and into register with the hopper discharge opening. The seeds will then flow down from the hopper and fill the pocket and be ready for discharge on the next revolution of the hopper. The feed openings in the pockets are made the proper size to accommodate three seeds in each pocket, but the number may of course be varied, if preferred. The feed openings will be suitably spaced from one another in the walls of the hopper, so that the seeds, when deposited in the furrow, will be the desired distance apart. I may arrange several of these hoppers side by side to seed several rows at the same time and operate the machine by a suitable power. A machine of this type would involve merely a multiplication of hoppers and I have not thought it necessary to illustrate it herein.

I claim as my invention:

1. A machine of the class described, comprising a frame having carrying wheels, a revolving hopper arranged between said carrying wheels and having feed openings in its periphery, and spouts therefor, said hopper consisting of a substantially circular receptacle adapted to contain the seeds in bulk which roll around and are thoroughly mixed as the hopper revolves, the discharge ends of said spouts being out of contact with the soil, and a furrow opener operating in advance of said hopper and having side wings or blades between which said spouts pass as said hopper revolves, means for permitting the discharge of the seeds while a spout is passing between said blades, and said blades serving as wind shields during the deposit of the seeds between them.

2. A sugar beet seeding machine, comprising a frame having an axle and carrying wheels therefor and handle bars, a hopper supported in said frame between said wheels and consisting of a receptacle wherein the seeds are deposited in bulk, said hopper being provided with a series of radial spouts, and means controlling the passage of the seeds to said spouts, the discharge ends of said spouts being out of contact with the ground, a furrow-opener operating in advance of said spouts and curved blades operating in the rear of said spouts.

3. A machine of the class described, comprising a frame and carrying wheels therefor, a hopper arranged to revolve in a vertical plane and having peripheral walls, which are inclined outwardly from the ends of the hopper toward the middle portion thereof, said peripheral walls having feed openings at intervals and slides therefor, said slides having pockets adapted to communicate with said openings, and feed spouts arranged to communicate with the said pockets and receive the seeds therefrom, and said slides normally registering with said feed openings, and means for actuating said slides at intervals to cause their pockets to register temporarily with said spouts.

4. A machine of the class described, comprising a frame having carrying wheels, a revolving hopper having feed openings at intervals, and feed slides having pockets arranged to normally register with said openings, means for actuating said slides, and guard plates provided within said hopper over said feed openings, said guard plates being open at each end and allowing the passage of seeds to said openings.

5. A machine for seeding sugar beet seed, comprising a frame having carrying wheels, a revolving hopper having a series of feed openings and spouts therefor, means for delivering the seeds through said feed openings in groups—there being two groups in each hill, and a furrow opener operating in advance of said hopper.

6. A machine for seeding sugar beets, comprising a frame, an axle having carrying wheels and a revolving hopper mounted on said axle between said wheels and having a series of radial spouts having their discharge ends out of contact with the ground and means controlling the entrance of seeds to said spouts, and a furrow opener arranged beneath said hopper and operating in advance of said spouts, and the walls of said furrow opener being adapted to inclose the discharge end of a spout and form a wind shield therefor during the discharge of the seeds from said spouts, substantially as described.

7. A machine of the class described, comprising a frame having an axle and carrying wheels and handle bars, said frame being capable of tilting, and means adjustably connecting it with said handle bars, a hopper mounted between said carrying wheels and having radial spouts, and means controlling the delivery of seed therethrough as said hopper revolves, a furrow opener operating in advance of the discharge end of each spout and covering blades operating in the rear of said furrow opener.

8. A machine of the class described, comprising a frame and axle, and carrying wheels therefor, a revolving hopper mounted in said frame and having a series of radial feed spouts, a furrow opener operating in advance of a spout and having blades between which each spout passes in the revolution of said hopper and covering blades arranged obliquely in the rear of said furrow opener, for the purpose specified.

In witness whereof, I have hereunto set my hand this 26th day of December 1908.

GUSTAV M. ROOS.

Witnesses:
OSCAR J. PETERSON,
RALPH W. OLSON.